United States Patent
Smith et al.

(10) Patent No.: US 6,367,673 B1
(45) Date of Patent: Apr. 9, 2002

(54) SPORTS EQUIPMENT RACK FOR A VEHICLE

(75) Inventors: Timothy C. Smith; Gregory A. Dean, both of McKinleyville; Scott R. Allen, Fieldbrook, all of CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/513,664

(22) Filed: Feb. 25, 2000

(51) Int. Cl.[7] .............................. B60R 9/10; B60R 9/00
(52) U.S. Cl. ..................... 224/405; 224/403; 224/556; 224/572; 224/924
(58) Field of Search ............................... 224/401–405, 224/329, 555, 556, 557, 572, 275, 924; 24/198, 200, 265 AL, 265 C, 265 R, 265 A; 410/101, 105, 112, 116; 296/37.6

(56) References Cited

U.S. PATENT DOCUMENTS

| | | | |
|---|---|---|---|
| 873,445 A | * | 12/1907 | Maltby ..................... 24/198 |
| 2,635,796 A | | 4/1953 | Davolt |
| 3,077,650 A | * | 2/1963 | Horne ..................... 24/200 |
| 3,132,780 A | | 5/1964 | Binding |
| 3,161,149 A | * | 12/1964 | Monus ................. 410/112 X |
| 3,257,051 A | * | 6/1966 | Browning ................. 224/572 |
| 3,388,886 A | * | 6/1968 | Tucker ................... 224/275 |
| 3,837,048 A | | 9/1974 | Lewis et al. |
| 3,894,768 A | * | 7/1975 | Connors et al. .......... 24/265 R |
| 3,917,338 A | * | 11/1975 | Becker |
| 4,108,342 A | | 8/1978 | Riva |
| 4,182,467 A | * | 1/1980 | Graber ................. 224/556 X |
| 4,253,594 A | | 3/1981 | Parks |
| 4,722,465 A | | 2/1988 | Brogie |
| 4,726,499 A | * | 2/1988 | Hoerner ............... 224/329 X |
| 4,852,779 A | | 8/1989 | Berg |
| 4,934,572 A | | 6/1990 | Bowman et al. |
| 4,949,890 A | * | 8/1990 | Schultz ..................... 224/275 |
| 5,014,890 A | | 5/1991 | Perry |
| D318,447 S | | 7/1991 | Haugen et al. |
| 5,092,504 A | | 3/1992 | Hannes et al. |
| 5,127,564 A | | 7/1992 | Romero |
| D329,414 S | | 9/1992 | Herzig |
| 5,230,449 A | | 7/1993 | Collins et al. |
| 5,255,464 A | | 10/1993 | Marecek |
| 5,427,286 A | | 6/1995 | Hagerty |
| 5,435,472 A | * | 7/1995 | Allen et al. ............ 224/924 X |
| D362,654 S | | 9/1995 | Keith |
| 5,479,892 A | * | 1/1996 | Edwards ................ 224/275 X |
| 5,516,020 A | | 5/1996 | Lawler et al. |

(List continued on next page.)

FOREIGN PATENT DOCUMENTS

| | | | | |
|---|---|---|---|---|
| DE | 2025192 | * | 8/1993 | ................. 224/275 |
| DE | 4203503 A1 | * | 8/1993 | ................. 224/275 |

*Primary Examiner*—Gregory M. Vidovich
(74) *Attorney, Agent, or Firm*—Kolisch, Hartwell, Dickinson, McCormack & Heuser

(57) ABSTRACT

A sports equipment rack for mounting to a vehicle, the vehicle including a first generally planar surface expanse and a second generally planar surface expanse disposed adjacent the first surface expanse in a concave relation thereto to form a corner. The rack comprises a base, the base including a first surface-contacting portion for supporting the base against the first surface expanse, a second surface-contacting portion for supporting the base against the second surface expanse, and an equipment-supporting portion for supporting equipment on the rack. The rack also includes at least one securing structure coupled to the base, wherein the securing structure is configured to simultaneously urge the first surface-contacting portion against the first surface expanse and the second surface-contacting portion against the second surface expanse to thereby secure the rack to the vehicle.

14 Claims, 4 Drawing Sheets

U.S. PATENT DOCUMENTS

| | | |
|---|---|---|
| 5,560,498 A | 10/1996 | Porter |
| D376,577 S | 12/1996 | Avery |
| 5,598,956 A | 2/1997 | Schenberg |
| 5,611,119 A | 3/1997 | Allen |
| 5,628,440 A | 5/1997 | Gallazzini |
| 5,641,106 A | 6/1997 | Slaughter et al. |
| 5,641,254 A * | 6/1997 | Sullivan ................ 224/275 X |
| 5,699,945 A | 12/1997 | Micklish |
| 5,730,346 A | 3/1998 | Adams et al. |
| 5,738,259 A | 4/1998 | Allen |
| 5,836,490 A | 11/1998 | Price |
| 5,887,840 A | 3/1999 | Hoffman |
| D412,482 S | 8/1999 | Chen |
| 5,956,979 A * | 9/1999 | Collins et al. |
| D416,855 S | 11/1999 | Englander |
| 5,992,719 A * | 11/1999 | Carter, III .................... 224/404 |
| 6,089,429 A * | 7/2000 | Everson ...................... 224/404 |

\* cited by examiner

SPORTS EQUIPMENT RACK FOR A VEHICLE

TECHNICAL FIELD

The present invention relates to vehicle-mounted sports equipment racks. More particularly, it provides a sports equipment rack that may be quickly and easily mounted in a pickup truck bed adjacent the tailgate of the truck.

BACKGROUND OF THE INVENTION

The transportation of sports equipment, such as bicycles, on a pickup truck poses unique problems not encountered when transporting sports equipment on other automobiles. Generally, some sort of rack system, such as a roof rack, is used when carrying bicycles on most automobiles. Roof rack systems typically employ two crossbars that are mounted across the roof of a vehicle to provide at least two secure points of attachment for mounting a bicycle to the vehicle. However, these systems are often not suited for use with pickup trucks. For example, many of these systems require the automobile to have a fairly long roofline so that the crossbars are spread for enough apart to allow the bike fork to be mounted to one bar and the rear wheel to the other. Pickup trucks often have too short a roofline for this type of rack. Second, the height of the roof of many pickup trucks may make it difficult both to attach a rack to the roof and to mount equipment on a rack attached to the roof.

Instead of using a roof rack, a pickup truck owner may choose to transport a bicycle loose in the bed of the truck. However, this method has several drawbacks. First, there is a danger that the bicycle may be ejected from the back of the vehicle under some driving conditions. Second, a loose bicycle may damage the truck bed, or may be damaged itself, by sliding or bouncing around in the truck bed during transport. Third, when carrying more than one bike, the bikes must often be laid on their sides at least partially on top of one another in the truck bed. This arrangement can cause damage to both bikes as the bikes slide around or bump each other while in transport. Thus, it is better to secure the bikes in the bed than to leave them loose. One solution is to tie or strap the bikes into the truck using tie-downs that are often standard equipment on pickup trucks. However, the bikes still must generally be laid on their sides in the truck bed, leading to the possibility that the bikes may scratch or damage the truck bed or each other during transport. Furthermore, it can be difficult to strap or tie the bikes in tightly enough to ensure they will not move when the truck changes speed or direction.

A second solution is to use a rack system designed to be mounted in a truck bed. Several different types of racks made for mounting in pickup truck beds are known. For example, one type requires special mounts to be bolted into the truck bed to which an ordinary roof rack may be mounted. Another type has equipment mounts that may be directly bolted to the truck. Both of these types of racks require holes to be drilled into a truck bed to mount the rack. Thus, these types of racks may not appeal to some truck owners, as drilling holes into the truck bed may require some time and expertise, and may lower the value of the truck. Moreover, once the mounts are bolted to the truck, they may be difficult to remove or reinstall.

Another type of pickup truck bed rack system consists of a strap or crossbar tensioned between the rails of a pickup truck bed to which bicycles may be mounted. This type of rack has several drawbacks. First, the racks are braced only against the sides of the truck bed. Thus, they may shift forward or backward when the truck decelerates or accelerates. Second, only the tension of the crossbar or strap between the side rails secures the racks to the truck. If the tensioning system loosens or fails, the crossbar or strap may come loose from the truck, possibly resulting in damage to the bicycles or the truck.

Other pickup truck rack designs balance the bicycles on the truck rails or hang the bike off of the tailgate outside of the truck bed. These designs are limited in the number of bikes they may hold, and do not place the bikes within the protective confines of the truck bed. Moreover, some of these designs require holes to be drilled into the truck body.

Therefore, there remains a need for a sports equipment rack for a pickup truck bed that may be quickly and securely mounted in the bed.

DETAILED DESCRIPTION OF THE PREFERRED EMBODIMENTS

Figure 1:
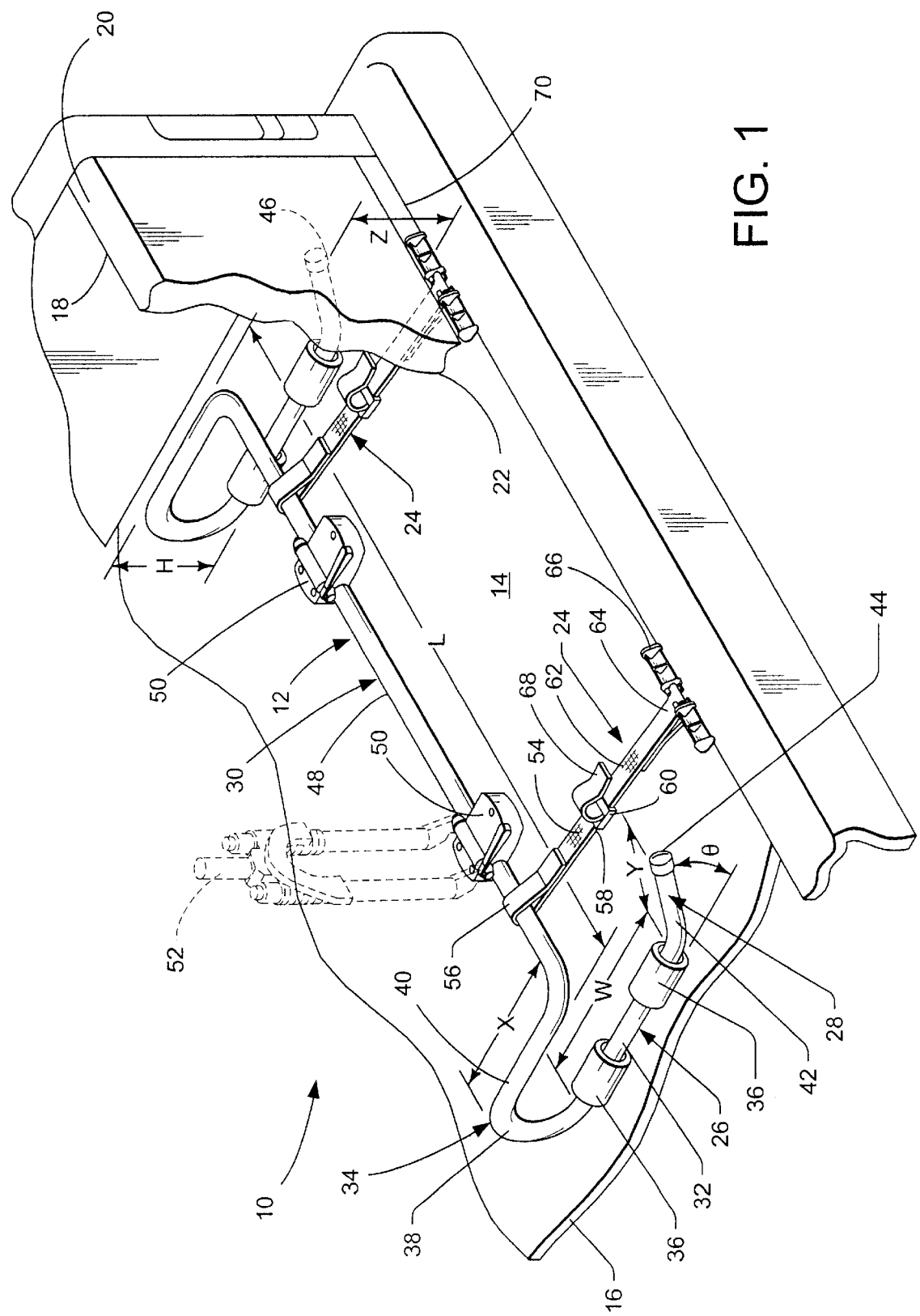
FIG. 1 is a perspective view of a sports equipment rack according to one embodiment of the present invention.
Figure 2:
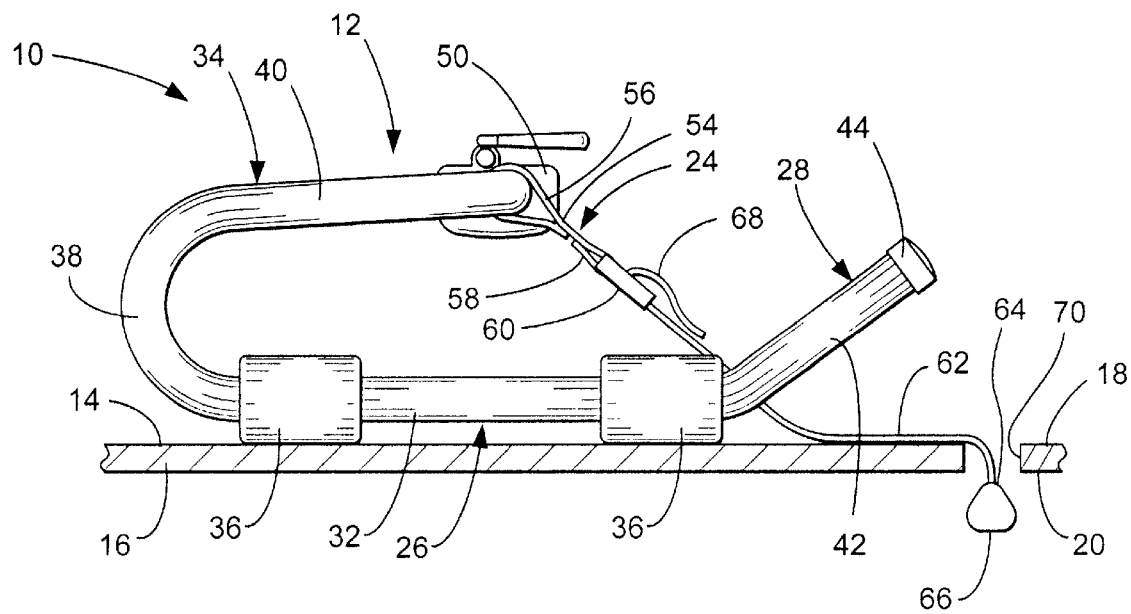
FIG. 2 is side view of the embodiment of FIG. 1, with a cutaway view of a pickup truck bed and a tailgate in an open position.
Figure 3:
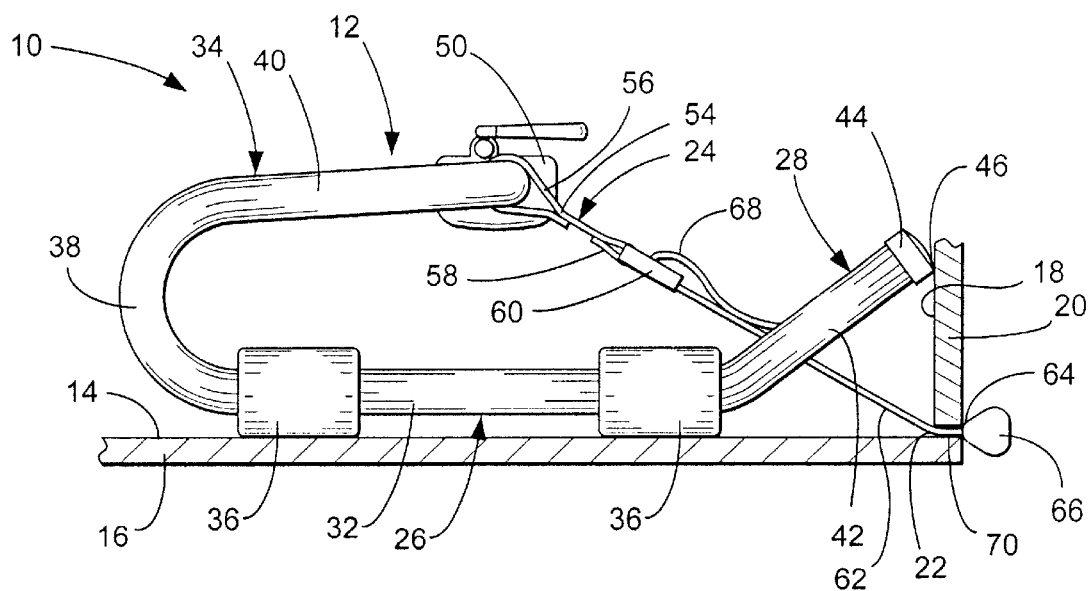
FIG. 3 is a side view of the embodiment of FIG. 1, with a cutaway view of a pickup truck bed and a tailgate in a closed position.

The present invention provides a lightweight, easy to install sports equipment rack that may be quickly mounted to a vehicle. One embodiment of the invention is shown in FIGS. 1–3 as a rack 10 for mounting in the bed of a pickup truck. Rack 10 includes a base 12 for supporting rack 10 against a first surface expanse 14, such as the upper surface of a truck bed 16, and a second surface expanse 18, such as the inner surface of a tailgate 20, in the region where first surface expanse 14 and second surface expanse 18 meet to form a corner 22. Rack 10 also includes at least one securing structure 24 that secures the rack to the vehicle by simultaneously urging base 12 against first surface expanse 14 and second surface expanse 18. Thus, securing structure 24 holds rack 10 firmly in corner 22, fixing rack 10 to the vehicle and preventing rack 10 from moving when the vehicle changes direction or speed.

Base 12 includes a first surface-contacting portion 26 for supporting rack 10 against bed 16, a second surface-contacting portion 28 for supporting rack 10 against tailgate 20, and an equipment-supporting portion 30 for mounting sports equipment to rack 10. These portions may be formed from a single piece of material, or may be constructed from more than one piece, depending upon the features desired in base 12. For example, if minimizing the storage size of rack 10 is an important design consideration, base 12 may be made from a plurality of pieces that may be disassembled for compact storage. In the preferred embodiment, however, base 12 has a one-piece design. This offers several advantages over other designs. For example, a one-piece design does not require any assembly before use, simplifying the mounting of rack 10. Also, the design reduces the risk of losing constituent parts of rack 10, and lessens the danger of failure or breakage at the joints between pieces.

Base 12 is generally constructed from a material that is strong and resistant to damage and oxidation. In the preferred embodiment, base 12 is formed from a length of 1⅛-inch outer diameter, 1/16-inch wall tubular steel, as this material may be easily formed into the various shapes for rack 10 that may be necessary for different types of vehicles. In the preferred embodiment, a first surface-contacting portion 26 and a second surface-contacting structure 28 are formed in each end of base 12 by bending the length of tubular steel into the desired shapes, described in more detail below. The tubular steel may be painted or otherwise coated to protect the rack from rust and damage, as well as to increase the grip of accessories on base 12.

Base 12 is supported against bed 16 by first surface-contacting portion 26. First surface-contacting portion 26 helps to prevent rack 10 from tipping or rocking when a vehicle to which rack 10 is mounted changes speed or direction, and supports equipment-supporting portion 30 over bed 16. In the preferred embodiment, first surface-contacting portion 26 includes a generally linear foot structure 32, and a support structure 34 that curves upward from foot structure 32 to meet equipment-supporting portion 30. The long axis of foot structure 32 is aligned generally perpendicular to the long axis of equipment supporting portion 30, increasing the stability of rack 10. The width W of foot structure 32 may be chosen to give rack 10 desired stability and storability characteristics. A wider foot structure 32 provides more stable support, but also takes up more storage space. A preferred range of measurements for the width W of foot structure 32 to provide reasonable stability and storability is 8–16 inches, and more preferably approximately 12 inches. To prevent first surface-contacting portion 26 from damaging bed 16, one or more pads 36 may be disposed between foot structure 32 and surface 14. In the preferred embodiment, two pads 36 are attached to each foot structure 32 relatively close to the ends of foot structure 32 so the stability of base 12 is not compromised by the use of pads 36.

In addition to foot structure 32, first surface-contacting portion 26 also includes support structure 34. Support structure 34 has a curved spacing region 38 that curves upward from one end of foot structure 32 to support equipment-supporting portion 30 above bed 16, and a generally linear connecting region 40 that connects spacing region 38 to equipment-supporting portion 30. In the preferred embodiment, each end of equipment-supporting portion 30 is held suspended above bed 16 by one support structure 34. Placing equipment-supporting portion 30 above bed 16 makes it easier to attach a bike to rack 10, because a user does not have to bend down as far to tighten the fork block.

The height H of support structure 34, along with the width W of foot structure 32, may be chosen to give rack 10 desired stability and storability characteristics. While support structure 34 may be made to any desired height, it is preferable for height H to be less than width W to increase the stability of rack 10. With a preferred foot structure length W of approximately 12 inches, a suitable range of heights h for support structure 34 would be 3–8 inches, and more preferably 4½–5½ inches, although it should be understood that values outside these ranges could be used. Similarly, connecting portion 40 may have any desired length X. However, for greater stability, equipment-supporting portion 30 is preferably positioned approximately above the middle of foot structure 32. Thus, if foot structure 32 has a length W of 8–16 inches, connecting portion 40 preferably has a length X of 4–8 inches. A particularly preferred length X for connecting portion 40 is approximately 6 inches.

Second surface-contacting portion 28 supports rack 10 against tailgate 20 to space equipment-supporting portion 30 away from tailgate 20, and to prevent rack 10 from rocking or tipping toward tailgate 20. In the preferred embodiment, second-surface contacting portion 28 includes a bracing structure 42 extending upwardly from each foot structure 32 at an angle θ toward tailgate 20. Though second surface-contacting portion 28 may contact tailgate 20 at any desired point, second surface-contacting portion 28 preferably contacts tailgate 20 at a point 44 on tailgate 20 spaced from corner 22. Placing the contact point 44 away from corner 22 increases the stability of rack 10 and reduces the tendency of rack 10 to rock or tip with changes in vehicle speed or direction. The point 44 at which second surface-contacting portions 28 contact tailgate 20 is determined by the length Y of bracing structure 42 and the angle θ between bracing structure 42 and foot structure 32. The values of these parameters may be chosen to give rack 10 desired stability characteristics. In the preferred embodiment, bracing structure 42 has a length Y between 3–9 inches, and more preferably between 4½–6 inches. Similarly, bracing structure 42 preferably extends upward from foot structure 32 at an angle θ between 15 and 70 degrees, and more preferably between 25 and 50 degrees.

Base 12 also includes equipment-supporting portion 30 for attaching sports equipment to rack 10. In the preferred embodiment, equipment-supporting portion 30 includes a crossbar 48 positioned between the two first surface-contacting portions 26. Crossbar 48 may have any desired length that fits within the truck bed. For example, crossbar 48 may extend substantially across bed 16 if maximum carrying capacity is desired. Likewise, crossbar 48 may be made shorter to decrease the amount of storage space taken by rack 10. Preferably, crossbar 48 is sized to carry at least two bicycles, yet still be small enough to easily handle and store. Typically lengths for crossbar 48 include lengths between 30–50 inches, and more preferably between 35–45 inches, although values outside these ranges could also be used. Though crossbar 48 may include permanent sports equipment mounts, it is preferably configured for the attachment of removable equipment mounts. For example, in FIG. 1, two removable bicycle fork blocks 50 are shown attached to crossbar 48, with a bicycle fork 52 shown in phantom attached to one.

Base 12 is secured to a vehicle with at least one securing structure 24. In the preferred embodiment, securing structure 24 secures rack 10 to the vehicle by simultaneously urging first surface-contacting portion 26 against bed 16 and second surface-contacting portion 28 against tailgate 20. Any suitable mechanism for stabilizing rack 10 in the vehicle may be used. In the preferred embodiment, securing structure 24 comprises a strap and anchor system that may be trapped between bed 16 and tailgate 20 to pull base 12 against bed 16 and tailgate 20. In FIG. 1, rack 10 is shown with two securing structures 24 coupled to base 12. Each securing structure 24 includes a first length of strap 54 with a loop at each end. First loop 56 extends around crossbar 48, and second loop 58 is coupled to a tensioning system, such as a buckle 60, for adjustably biasing base 12 against bed 16 and tailgate 20. A second length of strap 62 has a loop 64 at one end that is coupled to an anchor 66, and a loose end 68 that is adjustably coupled to buckle 60. First and second lengths of strap 54 and 62 are preferably made of a material strong enough to withstand repeated closures in the space between bed 16 and tailgate 20. A preferred strap is nylon webbing, and a particularly preferred strap is 1-inch nylon webbing.

The attachment of rack 10 to a pickup truck is illustrated in FIGS. 2–3. Generally, tailgate 20 is pivotally attached to bed 16, and may be pivoted between an open position, shown in FIG. 2, and a closed position, shown in FIG. 3. A space 70 exists between bed 16 and tailgate 20. Space 70 is typically wider when tailgate 20 is in the opened position than when it is in the closed position. Anchor 66 is sized to fit into space 70 when tailgate 20 is in the opened position, and to be trapped in space 70 when tailgate 20 is in the closed position. To attach rack 10 to a truck, rack 10 is first set on bed 16 of the truck with second surface-contacting portions 28 toward tailgate 20. Anchors 66 are then inserted into space 70, tailgate 20 is closed, and securing structure 24 is shortened by pulling loose end 68 of second length of strap 62. Pulling loose end 68 increases the tension of first surface-contacting portion 26 against bed 16 and second surface-contacting portion 28 against tailgate 20, thus securing rack 10 in the truck bed. Rack 10 may be removed from the vehicle by simply lowering tailgate 20 to the open position and removing anchors 66 from space 70.

Figure 4:
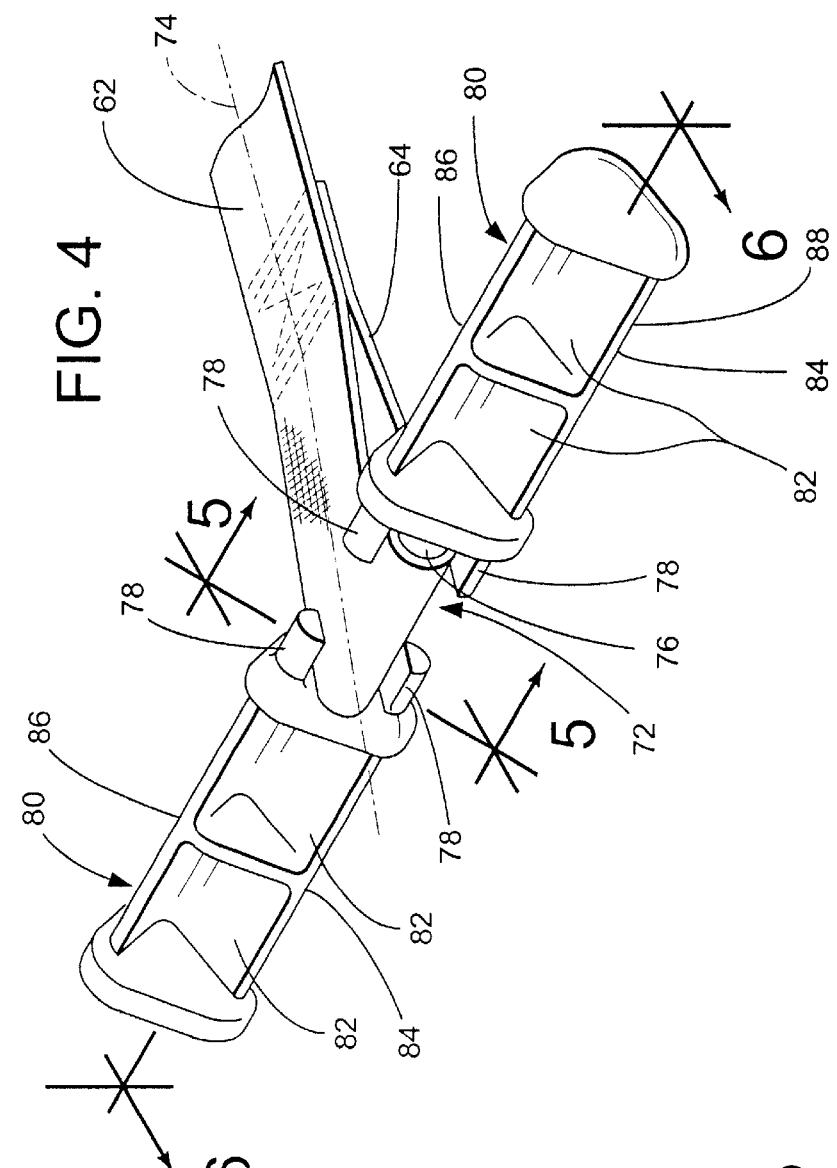
FIG. 4 is an enlarged perspective view of an anchor of the embodiment of FIG. 1.
Figure 5:
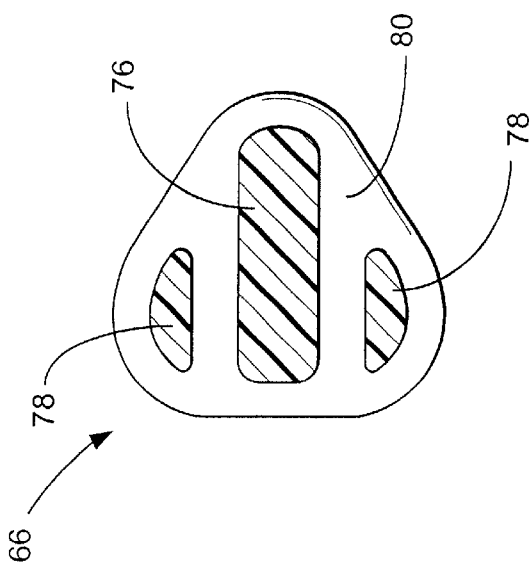
FIG. 5 is a sectional view taken along line 5—5 of FIG. 4.

Anchor 66 is configured to retain loop 64, yet allow loop 64 to be selectively removed from anchor 66 without having to open the loop. One embodiment of anchor 66 is shown in FIGS. 4–5. Anchor 66 includes a receiving portion 72 configured to receive loop 64. Receiving portion 72 is configured to retain loop 64 around anchor 66 when loop 64 is in a generally flat, unbiased configuration perpendicular to its long axis 74 to prevent the accidental disengagement of loop 64 from anchor 66. However, loop 64 may be easily removed from receiving portion 72 by deforming loop 64 perpendicular to long axis 74. To accomplish this, receiving portion 72 includes a neck portion 76 configured to support loop 64, and at least one retaining portion, such as a tab 78, configured to retain the loop of strap around the neck portion. In the preferred embodiment, anchor 66 also includes at least one, and preferably two, body portions 80. Where two body portions 80 are used, one body portion 80 may be disposed on each side of neck portion 76. Body portions 80 have a larger circumference than neck portion 76. Thus, when loop 64 is around neck portion 76, body portions 80 prevent loop 64 from slipping off the side of anchor 66. At least one, and preferably two, tabs 78 extend from each body portion 80 partially over neck portion 76.

Figure 6:
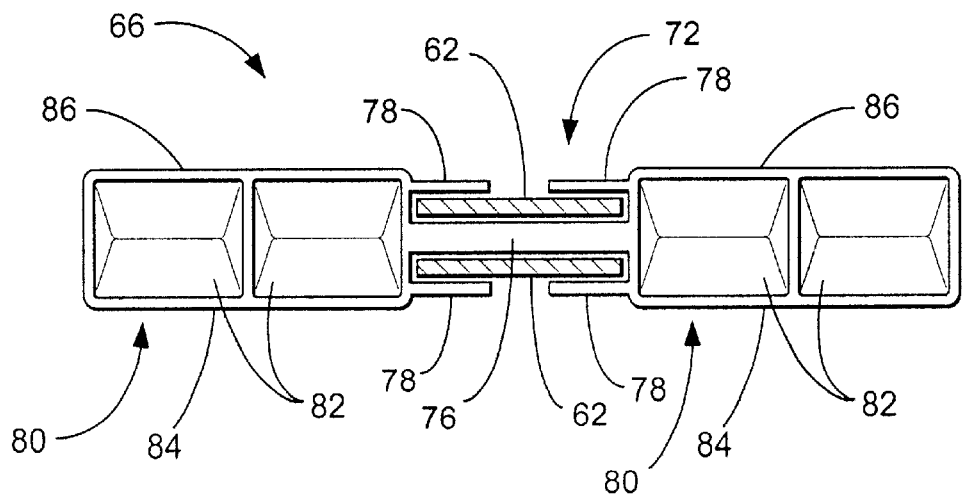
FIG. 6 is a partially sectioned view taken along line 6—6 of FIG. 4, with a loop of strap in an unbiased position.
Figure 7:
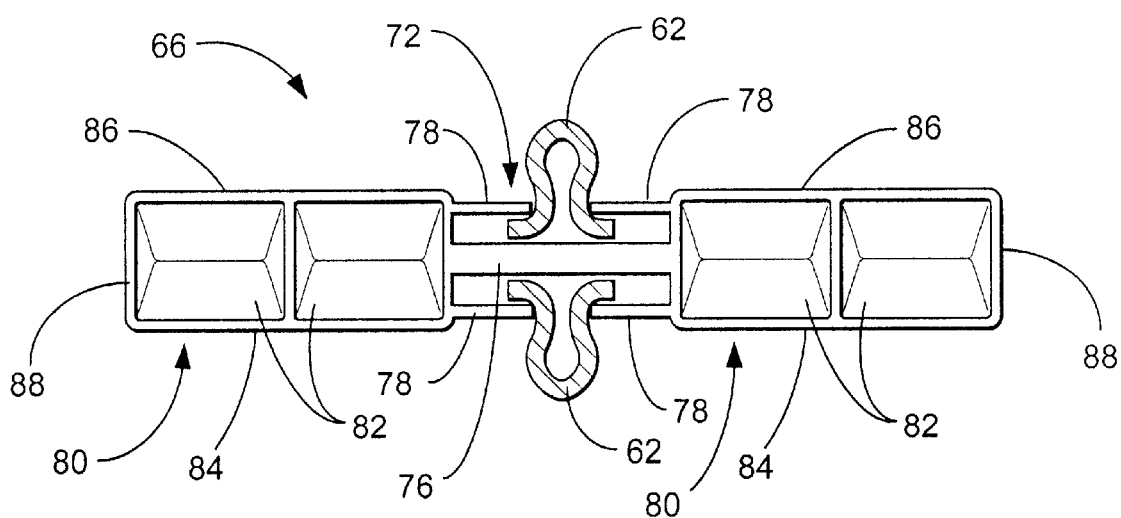
FIG. 7 is a partially sectioned view taken along line 6—6 of FIG. 4, with the loop of strap in a biased position.

The physical properties of the strap from which loop 64 is made allow loop 64 to be removed from anchor 66 without opening the loop. For example, while the nylon strap of the preferred embodiment typically is flexible, it has a rest or unbiased state in which it remains relatively flat. An example of this is shown in FIGS. 6 and 7. FIG. 6 shows a cross-section of the strap in loop 64 in a normal, unbiased or rest configuration. In this configuration, the strap has a generally flat cross section, substantially covering the entire neck portion 76 of anchor 66. The strap cannot be removed from the neck portion because of tabs 78 so long as the strap remains in the unbiased configuration. Because the strap remains in the unbiased configuration unless force is applied thereto, the strap will not come off the neck unless a user intentionally biases the strap out of the unbiased configuration.

In contrast, FIG. 7 shows a cross-section of loop 64 in a biased configuration, created by bending or pinching the strap in loop 64 in a direction substantially perpendicular to long axis 74. In this biased configuration, the deformed cross-section of the strap allows one edge of the strap to be slid through the gap between the tabs. Thus, loop 64 may be removed from anchor 66 by pulling the strap through the gap and passing the anchor out of the loop.

Neck portion 76 may be made to any desired size, but preferably is just wider than the width of second length of strap 62 to minimize the sliding of loop 64 along neck portion 76. For instance, if 1-inch webbing is used for second length of strap 62, neck portion preferably has a width of approximately 1⅛ inch. Tabs 78 should be sized to retain loop 64, yet not to prevent its removal. Typical lengths for tabs 78 are from ⅛–⅜ inch, and more preferably ¼ inch. This spaces opposing tabs 78 ⅜–⅞ inch apart, which provides adequate room therebetween for the removal of loop 64.

Body portions 80 should fit through space 70 when tailgate 20 is in the open position, and to be retained in space 70 when tailgate 20 is in the closed position. In the preferred embodiment, body portions 80 have an elongate shape to spread the pressure exerted by anchor 66 against the outside of tailgate 20 over a relatively wide area to lessen the pressure against any one part of the tailgate exterior. Preferred lengths for each body portion 80 are between 1–4 inches long, and more preferably between 1¾–2¾ inches. Similarly, anchor 66 may have any desired cross-sectional shape. In the preferred embodiment, anchor 66 has a triangular cross-section, with sides between ½–1¼ inch long. More preferably, each side of anchor 66 is ⅞-inch long. Preferably, anchor 66 has a one-piece design, made of a rigid molded plastic. Anchor 66 may have a solid structure, but preferably includes hollowed-out portions 82 to reduce the weight and cost of anchors 66. In the preferred embodiment, anchor 66 has two solid faces 84 and 86 for contacting the truck when anchor 66 is in use, and a third face 88 with hollowed-out portions 82 that faces away from tailgate 20 when anchor 66 is trapped in space 70.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A bike rack for mounting in the bed of a pick-up truck comprising an elongate crossbar, elevating support structure connected to the bar configured to hold the bar in an elevated parallel relationship to the bed of a pick-up truck, at least one fork block mounted on the crossbar configured for attachment to the front fork of a bicycle, at least one strap member having a first end connected to the crossbar and a second end equipped to be securely captured in a gap between a bed and closed tail-gate of a pick-up truck, the strap member having an adjustable length that can be tensioned to substantially immobilize the crossbar above the pick-up bed, and forward of the closed tail-gate.

2. The bike rack of claim 1, wherein the elevating support structure and crossbar are all formed from a single piece of tubing.

3. The bike rack of claim 1, wherein the elevating support structure includes two curved rail structures, the crossbar spanning from one rail structure to the other rail structure.

4. The bike rack of claim 3, wherein each rail structure has a foot portion configured to rest on the bed of a pick-up when the crossbar is elevated above the bed.

5. The bike rack of claim 4, wherein each foot portion is substantially linear.

6. The bike rack of claim 4, wherein each foot portion has at least one pad that protects the truck and resists slippage.

7. The bike rack of claim 3, wherein each rail structure has a distal diagonal brace portion configured to contact the closed tail-gate at a level significantly higher than the gap between the bed and closed tail-gate of the pick-up truck.

8. The bike rack of claim 1 further comprising a second fork block mounted on the crossbar configured for attachment to the front fork of a bicycle.

9. The bike rack of claim 1 further comprising a second strap member having a first end connected to the bar and a second end equipped to be securely captured in a small gap between a bed and closed tail-gate of a pick-up truck, the strap member having an adjustable length that can be tensioned to substantially immobilize the crossbar above the pick-up bed, and forward of the closed tail-gate.

10. The bike rack of claim 1, wherein the second end of the strap member is attached to a rigid anchor device that has an elongate axis substantially longer than the width of the strap member for spreading pressure across a back side of the tail-gate.

11. The bike rack of claim 1, wherein the second end of the strap member has a loop that fits in a neck portion of a rigid anchor device, the anchor having a width that is small enough to fit through a gap between the bed and tailgate of a pick-up truck when the tailgate is open, but not fit when the tailgate is closed.

12. An equipment rack for mounting in the bed of a pick-up truck comprising an elongate crossbar, elevating support structure connected to the bar configured to hold the bar in an elevated parallel relationship to the bed of a pick-up truck, and a rigid frame portion configured for extending from a point on or near the bed of the truck to contact the closed tailgate at a level significantly higher than the bed, at least one strap device adapted to be tensioned between the crossbar and a gap between the bed and closed tailgate of a pickup truck, and at least one mounting device attached to the crossbar specifically configured for carrying a particular type of recreational cargo.

13. The equipment rack of claim 12, wherein the at least one mounting device is a fork block for securing the fork of a bicycle to the crossbar.

14. The equipment rack of claim 12, wherein the at least one strap device having a first end connected to the crossbar and a second end equipped to be securely captured in a small gap between a bed and closed tail-gate of a pick-up truck, the strap device having an adjustable length that can be tensioned to substantially immobilize the crossbar above the pick-up bed, and forward of the closed tail-gate.

* * * * *